(12) United States Patent
Dayalan et al.

(10) Patent No.: US 10,269,235 B2
(45) Date of Patent: Apr. 23, 2019

(54) SYSTEM AND METHOD TO ASSIST BUILDING AUTOMATION SYSTEM END USER BASED ON ALARM PARAMETERS

(71) Applicant: Trane International Inc., Davidson, NC (US)

(72) Inventors: Udhaya Kumar Dayalan, White Bear Lake, MN (US); Mark Martin, Chisago City, MN (US)

(73) Assignee: Trane International Inc., Davidson, NC (US)

( * ) Notice: Subject to any disclaimer, the term of this patent is extended or adjusted under 35 U.S.C. 154(b) by 0 days.

(21) Appl. No.: 15/685,856

(22) Filed: Aug. 24, 2017

(65) Prior Publication Data

US 2018/0061212 A1 Mar. 1, 2018

Related U.S. Application Data

(60) Provisional application No. 62/379,863, filed on Aug. 26, 2016.

(51) Int. Cl.
*G08B 1/08* (2006.01)
*G08B 25/10* (2006.01)
(Continued)

(52) U.S. Cl.
CPC ........... *G08B 25/10* (2013.01); *G08B 21/185* (2013.01); *G08B 21/187* (2013.01);
(Continued)

(58) Field of Classification Search
CPC ..................................... G05B 1/00; F24F 1/00
See application file for complete search history.

(56) References Cited

U.S. PATENT DOCUMENTS 5,311,451 A 5/1994 Barrett
5,321,603 A 6/1994 Schwenke
(Continued)

FOREIGN PATENT DOCUMENTS

CN 101589351 A 6/2008
CN 101427239 A 5/2009
(Continued)

OTHER PUBLICATIONS

"BACnet, LonWorks War Continues for BAS Manufacturers", p. 14, Mar. 10, 1997 Issue of Air Conditioning, Heating & Refrigerations News, 1 pg.
(Continued)

*Primary Examiner* — Shirley Lu
(74) *Attorney, Agent, or Firm* — The Salermo Law Firm, P.C.

(57) ABSTRACT

Disclosed are systems and methods for operating a Building Automation System (BAS) that communicates with end devices via a master-slave token passing network (MSTP), e.g., BACNet, a local operating network (LON), or any other suitable communications protocol to receive alarm messages. The BAC enables a user to rapidly and effectively respond to an alarm by providing an alarm assistance message that provides the user with detailed remediation procedures concerning the current alarm. The nature and content of the alarm assistance message and/or the attachments is determined based upon on a combination of alarm and system parameters, and may be tailored by an administrator to meet local requirements. The alarm assistance message may include one or more remedial or diagnostic attachments, such as a troubleshooting guide, user manual, a video, graphics, or a firmware update, and may include links to external media or cloud-hosted documents.

20 Claims, 6 Drawing Sheets

(51) Int. Cl.
  *G08B 21/18* (2006.01)
  *G08B 25/00* (2006.01)
  *H04W 4/38* (2018.01)
  *G08B 25/14* (2006.01)

(52) U.S. Cl.
  CPC ........... *G08B 25/001* (2013.01); *G08B 25/14* (2013.01); *H04W 4/38* (2018.02)

(56) References Cited

U.S. PATENT DOCUMENTS

| | | |
|---|---|---|
| 5,384,697 A | 1/1995 | Pascucci |
| 5,444,851 A | 8/1995 | Woest |
| 5,463,735 A | 10/1995 | Pascucci et al. |
| 5,511,188 A | 4/1996 | Pascucci et al. |
| 5,522,044 A | 5/1996 | Pascucci et al. |
| 5,550,980 A | 8/1996 | Pascucci et al. |
| 5,559,955 A | 9/1996 | Dev et al. |
| 5,598,566 A | 1/1997 | Pascucci et al. |
| 5,761,432 A | 6/1998 | Bergholm et al. |
| 5,805,442 A | 9/1998 | Crater et al. |
| 5,884,072 A | 3/1999 | Rasmussen |
| 5,897,630 A | 4/1999 | Schneider Huddleston Virta et al. |
| 5,982,362 A | 11/1999 | Crater et al. |
| 5,999,179 A | 12/1999 | Kekic et al. |
| 6,028,998 A | 2/2000 | Gloudeman et al. |
| 6,067,477 A | 5/2000 | Wewalaarachchi et al. |
| 6,098,116 A | 8/2000 | Nixon et al. |
| 6,104,963 A | 8/2000 | Cebasek et al. |
| 6,115,713 A | 9/2000 | Pascucci et al. |
| 6,119,125 A | 9/2000 | Gloudeman et al. |
| 6,141,595 A | 10/2000 | Gloudeman et al. |
| 6,145,751 A | 11/2000 | Ahmed |
| 6,148,355 A | 11/2000 | Mahalingam |
| 6,154,681 A | 11/2000 | Drees et al. |
| 6,157,943 A | 12/2000 | Meyer |
| 6,167,316 A | 12/2000 | Gloudeman et al. |
| 6,240,326 B1 | 5/2001 | Gloudeman et al. |
| 6,241,156 B1 | 6/2001 | Kline et al. |
| 6,263,387 B1 | 7/2001 | Chrabaszcz |
| 6,266,726 B1 | 7/2001 | Nixon et al. |
| 6,334,107 B1 | 12/2001 | Gale et al. |
| 6,353,853 B1 | 3/2002 | Gravlin |
| 6,389,331 B1 | 5/2002 | Jensen et al. |
| 6,405,103 B1 | 6/2002 | Ryan et al. |
| 6,446,058 B1 | 9/2002 | Brown |
| 6,487,457 B1 | 11/2002 | Hull et al. |
| 6,496,893 B1 | 12/2002 | Arai |
| 6,571,236 B1 | 5/2003 | Ruppelt |
| 6,580,950 B1 | 6/2003 | Johnson et al. |
| 6,584,095 B1 | 6/2003 | Jacobi et al. |
| 6,584,096 B1 | 6/2003 | Allan |
| 6,598,056 B1 | 7/2003 | Hull et al. |
| 6,636,893 B1 | 10/2003 | Fong |
| 6,708,505 B2 | 3/2004 | Nakamura et al. |
| 6,714,977 B1 | 3/2004 | Fowler et al. |
| 6,832,120 B1 | 12/2004 | Frank et al. |
| 6,834,298 B1 | 12/2004 | Singer et al. |
| 6,925,571 B1 | 8/2005 | Motoyama et al. |
| 6,999,824 B2 | 2/2006 | Glanzer et al. |
| 7,010,796 B1 | 3/2006 | Strom et al. |
| 7,065,769 B1 | 6/2006 | Tolopka |
| 7,080,142 B2 | 7/2006 | Galloway et al. |
| 7,095,321 B2 | 8/2006 | Primm et al. |
| 7,136,914 B2 | 11/2006 | Motoyama |
| 7,165,109 B2 | 1/2007 | Chiloyan et al. |
| 7,194,537 B2 | 3/2007 | Motoyama et al. |
| 7,206,791 B2 | 4/2007 | Hind et al. |
| 7,240,106 B2 | 7/2007 | Cochran et al. |
| 7,246,162 B2 | 7/2007 | Tindal |
| 7,249,170 B2 | 7/2007 | Tindal et al. |
| 7,250,856 B2 | 7/2007 | Havekost et al. |
| 7,251,534 B2 | 7/2007 | Walls et al. |
| 7,275,079 B2 | 9/2007 | Brodsky et al. |
| 7,287,085 B1 | 10/2007 | Motoyama et al. |
| 7,287,257 B2 | 10/2007 | Meza |
| 7,289,995 B2 | 10/2007 | Motoyama et al. |
| 7,293,253 B1 | 11/2007 | Soukup |
| 7,296,079 B2 | 11/2007 | Motoyama et al. |
| 7,302,469 B2 | 11/2007 | Motoyama et al. |
| 7,305,465 B2 | 12/2007 | Wing et al. |
| 7,313,573 B2 | 12/2007 | Leung et al. |
| 7,320,023 B2 | 1/2008 | Chintalapati et al. |
| 7,324,986 B2 | 1/2008 | Aaron |
| 7,337,242 B1 | 2/2008 | Motoyama et al. |
| 7,349,761 B1 | 3/2008 | Cruse |
| 7,392,310 B2 | 6/2008 | Motoyama et al. |
| 7,421,474 B2 | 9/2008 | Motoyama et al. |
| 7,433,740 B2 | 10/2008 | Hesse et al. |
| 7,437,452 B2 | 10/2008 | Motoyama |
| 7,437,596 B2 | 10/2008 | McFarland |
| 7,447,766 B2 | 11/2008 | Motoyama et al. |
| 7,500,003 B2 | 3/2009 | Motoyama et al. |
| 7,502,848 B2 | 3/2009 | Motoyama et al. |
| 7,506,048 B1 | 3/2009 | Motoyama |
| 7,512,450 B2 | 3/2009 | Ahmed |
| 7,519,698 B2 | 4/2009 | Motoyama |
| 7,533,167 B2 | 5/2009 | Motoyama et al. |
| 7,533,333 B2 | 5/2009 | Motoyama et al. |
| 7,536,450 B2 | 5/2009 | Motoyama et al. |
| 7,574,503 B2 | 8/2009 | Motoyama et al. |
| 7,606,894 B2 | 10/2009 | Motoyama et al. |
| 7,610,372 B2 | 10/2009 | Motoyama et al. |
| 7,610,374 B2 | 10/2009 | Motoyama et al. |
| 7,634,555 B1 | 12/2009 | Wainscott, Jr. et al. |
| 7,647,397 B2 | 1/2010 | Motoyama et al. |
| 7,730,020 B2 | 6/2010 | Leung et al. |
| 7,765,289 B2 | 7/2010 | Park |
| 7,765,826 B2 | 8/2010 | Nichols |
| 7,870,090 B2 | 1/2011 | McCoy et al. |
| 7,904,186 B2 | 3/2011 | Mairs et al. |
| 7,917,232 B2 | 3/2011 | McCoy et al. |
| 8,024,054 B2 | 9/2011 | Mairs et al. |
| 8,050,801 B2 | 11/2011 | Richards et al. |
| 8,055,386 B2 | 11/2011 | McCoy et al. |
| 8,055,387 B2 | 11/2011 | McCoy et al. |
| 8,099,178 B2 | 1/2012 | Mairs et al. |
| 8,180,824 B2 | 5/2012 | McCoy et al. |
| 8,290,627 B2 | 10/2012 | Richards et al. |
| 8,725,298 B2 | 5/2014 | Wallaert |
| 8,830,267 B2 | 9/2014 | Brackney |
| 8,890,675 B2 | 11/2014 | Ranjan et al. |
| 9,258,201 B2 | 2/2016 | McCoy et al. |
| 2002/0016639 A1 | 2/2002 | Smith et al. |
| 2002/0029096 A1 | 3/2002 | Takai et al. |
| 2002/0042845 A1 | 4/2002 | Burmann et al. |
| 2002/0136203 A1 | 9/2002 | Liva et al. |
| 2002/0152028 A1 | 10/2002 | Motoyama et al. |
| 2002/0152292 A1 | 10/2002 | Motoyama et al. |
| 2003/0084176 A1 | 5/2003 | Tewari et al. |
| 2003/0135765 A1 | 7/2003 | Hind et al. |
| 2003/0158975 A1 | 8/2003 | Frank et al. |
| 2003/0159129 A1 | 8/2003 | Frank et al. |
| 2003/0167323 A1 | 9/2003 | Motoyama et al. |
| 2004/0059808 A1 | 3/2004 | Galloway et al. |
| 2004/0075549 A1 | 4/2004 | Haller |
| 2004/0143510 A1 | 7/2004 | Haeberle et al. |
| 2004/0148288 A1 | 7/2004 | Haeberle et al. |
| 2004/0215694 A1 | 10/2004 | Podolsky |
| 2004/0215740 A1 | 10/2004 | Frank et al. |
| 2004/0230323 A1 | 11/2004 | Glanzer |
| 2004/0243988 A1 | 12/2004 | Ota |
| 2004/0249913 A1 | 12/2004 | Kaufman |
| 2004/0254915 A1 | 12/2004 | Motoyama et al. |
| 2004/0255023 A1 | 12/2004 | Motoyama et al. |
| 2005/0071483 A1 | 3/2005 | Motoyama |
| 2005/0090915 A1 | 4/2005 | Geiwitz |
| 2005/0177642 A1 | 8/2005 | Motoyama et al. |
| 2006/0010232 A1 | 1/2006 | Page et al. |
| 2006/0047787 A1 | 3/2006 | Agarwal |
| 2006/0058923 A1 | 3/2006 | Kruk et al. |
| 2006/0130107 A1 | 6/2006 | Gonder et al. |
| 2006/0155824 A1 | 7/2006 | Motoyama et al. |

(56) References Cited

U.S. PATENT DOCUMENTS

| | | | |
|---|---|---|---|
| 2006/0184659 A1 | 8/2006 | Motoyama et al. | |
| 2007/0005736 A1 | 1/2007 | Hansen et al. | |
| 2007/0043476 A1 | 2/2007 | Richards et al. | |
| 2007/0061046 A1 | 3/2007 | Mairs et al. | |
| 2007/0067062 A1* | 3/2007 | Mairs | G09B 25/04 700/275 |
| 2007/0261062 A1 | 11/2007 | Bansal et al. | |
| 2008/0281472 A1 | 11/2008 | Podgorny et al. | |
| 2009/0083416 A1 | 3/2009 | Nass et al. | |
| 2011/0047259 A1 | 2/2011 | Sato et al. | |
| 2011/0047418 A1 | 2/2011 | Drees et al. | |
| 2011/0131336 A1 | 6/2011 | Wang et al. | |
| 2011/0213502 A1 | 9/2011 | Uden | |
| 2012/0109383 A1 | 5/2012 | Richards et al. | |
| 2014/0142727 A1 | 5/2014 | Giering et al. | |
| 2014/0266671 A1 | 9/2014 | Huynh et al. | |
| 2014/0343886 A1* | 11/2014 | Berinato | G05B 23/0256 702/123 |
| 2016/0239487 A1 | 8/2016 | Potharaju et al. | |
| 2016/0337166 A1* | 11/2016 | Duca | H04L 41/069 |

FOREIGN PATENT DOCUMENTS

| | | |
|---|---|---|
| CN | 101632050 A | 1/2010 |
| GB | 2444451 A | 6/2008 |
| GB | 2445489 A | 7/2008 |
| GB | 2445686 A | 7/2008 |
| GB | 2465506 A | 5/2010 |
| WO | 2007/024573 A2 | 3/2007 |
| WO | 2007/024622 A2 | 3/2007 |
| WO | 2007/024623 A2 | 3/2007 |
| WO | 2010/096313 A2 | 8/2010 |

OTHER PUBLICATIONS

"Controls Companies See Opportunities on Internet", Mar. 1, 1997 Issue of Energy User News, 4 pgs.

Tracer Summit Web Server, Dated Mar. 2003, Document No. BAS-PRC014-EN, 13 pgs.

"Infinity WebServer" brochure, Copyright 1997 by Andover Controls Corporation, Document No. DS-WEBSVR-A, 2 pgs.

"Facility Management Unleashed: web.Client", Copyright 2002 by Andover Controls, Document No. BR-WC-A, 6 pgs.

"Building Automation Systems on the Internet", by Albert T.P. So, W.L. Chan and W.L. Tse, May/Jun. 1997 Issue of Facilities Magazine, vol. 15, No. 5/6, pp. 125-133.

"Remote Building Monitoring and Control", an ACEEE paper, dated Jul. 18, 1996, 13 pgs.

Remote Building Control Using the Internet,: by Edward Finch, Dec. 1998 Issue of Facilities Magazine, vol. 15-No. 12/13, pp. 356-360.

"Marketing Tracer Summit", a marketing guide dated Jan. 1998, Order No. BAS-MG-46, 12 pgs.

"Tracer Summit Users Network", a marketing guide dated Mar. 2002, Order No. BAS-SLM005-EN, 12 pgs.

Marketing the Tracer ZN.511 and ZN.521 Zone Controllers, a marketing guide dated Feb. 2001, Order No. BAS-SLM008-EN, 12 pgs.

hittp://www.nettedautomation.com/glossary_menue/glossy_r.html— The Net is the Automation, Netted Automation GmbH, Information and Communication Systems (NAICS), 2000-2002, composed by John Black, Web page—http://www.nettedautomation.com/glossary_menue/glossy_r_html, printed Jan. 20, 2008, 2pgs.

"An Efficient Execution Model for Dynamically Reconfigurable Component Software"; Andreas Gal, Peter H. Frohlich, Michael Franz; Department of Information and Computer Science—University of California, Irvine; May 31, 2002; pp. 1-7; http://research.microsoft.com/~cszypers/events/WCOP2002/10_Gal.pdf.

Microsoft Computer Dictionary, Fifth Edition, "Server" definition, Published: 2002, Publisher: Microsoft Press, p. 474.

PersonalSCADA 2.0 User's Guide, Eutech Cybernetics Pte Ltd., 2002, 401 pgs.

"Tracer Summit, Building Automation System," TRANE, Doc #BAS-PRC001-EN, Aug. 2002, 20 pgs.

Enterprise Buildings Integrator R310, Specification Data, Honeywell, Mar. 2003, pp. 1-20.

"Connecting LonWorks and TCP/IP Enterprise Networks—Real Application Successes", by Coactive Aesthetics, dated 1997, 9 pgs.

"White Paper: BACnet vs. Lon—The War is Over", 2006, Honeywell International Inc., 3 pgs.

\* cited by examiner

SYSTEM AND METHOD TO ASSIST BUILDING AUTOMATION SYSTEM END USER BASED ON ALARM PARAMETERS

CROSS-REFERENCE TO RELATED APPLICATION

This application claims the benefit of and priority to U.S. Provisional Application Ser. No. 62/379,863 entitled "SYSTEM AND METHOD TO ASSIST BUILDING AUTOMATION SYSTEM END USER BASED ON ALARM PARAMETERS" and filed Aug. 26, 2016, the entirety of which is hereby incorporated by reference herein for all purposes.

BACKGROUND

1. Technical Field

The present disclosure relates generally to building automation systems, and in particular, to building automation systems which provide fault remediation instructions to a user in response to an alarm condition.

2. Background of Related Art

Building automation systems (BAS) are used to coordinate, manage, and automate control of diverse environmental, physical, and electrical building subsystems, particularly HVAC and climate control but also including security, lighting, power, and the like. Typical existing BAS systems are hardwired or use a proprietary communication standard or protocol to link the various subsystems and provide system-wide user access, monitoring, and control. More recently, BAS systems that employ wireless communications and battery-powered devices have gained acceptance.

A BAS can comprise a plurality of end devices, a communication network, a BAS controller (also known as a BAS server engine), and a graphical user interface (GUI) or other means of providing control and reporting data to a user. The end devices are each typically associated with a room, a space, a system, or a subsystem for at least a portion of a building or a campus. The communication network may support a plurality of communication protocols and communicatively couples end devices to the BAS controller. Examples of the types of data that these systems collect about the space, building or system can include pressures, temperatures, humidity level, power/energy readings, diagnostic data, and other run-time statistics.

BAS systems are robust systems customized for a particular installation, however, from time to time a BAS experiences faults or other operational conditions which trigger an alarm at the BAS controller or GUI. Although an alarm provides a user with basic information about a condition, it is the responsibility of the user to execute an appropriate response plan in a timely manner. In instances where the user is unable to make the correct response determination, whether due to inexperience, unfamiliarity with a particular BAS component or a particular failure mode, or any other reason, the lack of a timely resolution may lead to more issues and increase the damage to the equipment or system. A BAS that enables a user to identify and execute the appropriate response to an alarm would be a welcome advance in the art.

SUMMARY

The present invention substantially addresses the aforementioned shortcomings and relates to alarm processing systems, methods and apparatus for a building automation system (BAS). In one embodiment of the present disclosure, a building automation system controller (BASC) is adapted for use in a building automation system. The BAS includes one or more end devices coupled to the BASC via a building automation communication network. The building automation communication network may comprise a BACnet, a LON, and/or a wireless mesh network. An alarm processor coupled to the BAS is configured to receive an alarm message to generate an alarm assistance message. The alarm assistance message includes remediation media and a recipient address. The alarm processor is configured to receive the alarm message generated by an end device. The alarm message includes one or more alarm parameters. The alarm assistance message may be generated based on at least one alarm parameter included in the alarm message. The alarm assistance message is transmitted to an end user at the recipient address.

The alarm parameter may include one, some, or all of an end device type, a unique end device identifier, a sensor value, a status identifier, an alarm severity indicator, an end device location, a network identifier, a timestamp, and/or an alarm priority. In some embodiments, the recipient address is determined, at least in part, based upon the time of day at which the alarm assistance message is transmitted. In some embodiments, the recipient address is determined, at least in part, based upon an alarm time stamp. The transmission of the alarm response may be via one or more of an email message, an SMS message, an MMS message, and/or an application programming interface (API). In some embodiments, the remediation media comprises at least one of a document and/or a hyperlink.

In some embodiments of the present disclosure, the alarm processor further comprises an alarm assistance map that associates distinct combinations of one or more alarm parameters with corresponding remediation media and/or corresponding recipient address. The alarm processor generates the alarm response in accordance with the associations stored in the alarm assistance map. The alarm assistance map may be user-configurable, and/or may be configurable via instructions downloaded from a remote server.

In another aspect, an exemplary embodiment of the present disclosure is directed to a building automation system (BAS) that include one or more end devices. The end devices are configured to transmit an alarm message that contains at least one alarm parameter. A building automation network communicatively couples the one or more end devices and a building automation system controller (BASC). The building automation system controller includes a processor and a memory storing executable instructions, which, when executed on the processor, cause the building automation system controller to receive an alarm message from an end device, identify remediation media and a recipient address corresponding to the alarm message, and transmit an alarm assistance message comprising the identified remediation media to the recipient address.

In some embodiments, the executable instructions further cause the building automation system controller to format the alarm assistance message in accordance with the type of recipient address. In some embodiments, the executable instructions further cause the building automation system controller to transmit the alarm assistance message based upon a determination that the identified recipient address of the alarm assistance message is designated to receive an alarm assistance messages at the current time. A graphical user interface (GUI) may be communicatively coupled to the building automation system controller that is configured to enable an end user to associate end device alarm parameters with remediation media and/or a recipient address. The building automation communication network may include a BACnet, a LON, and/or a wireless mesh network.

Another exemplary embodiment is directed to a method of operating a building automation system that includes the steps of providing a response map that associates distinct combinations of one or more alarm parameters with corresponding remediation media and a corresponding recipient address; receiving, from an end device of a building automation network, an alarm message comprising an alarm parameter; identifying remediation media and a recipient address corresponding to the alarm message; and transmitting an alarm assistance message to the recipient address, wherein the alarm assistance message includes the identified remediation media. The transmitting may be performed based upon a determination that the identified recipient address is designated to receive an alarm assistance messages at the current time.

In some embodiments, the method includes formatting the alarm assistance message in accordance with the type of recipient address. The method may include detecting an access to the remedial media by the recipient.

Still another exemplary embodiment is directed to an alarm processing method in a building automation system having a building automation system controller and a building automation end device. The alarm processing method includes the steps of transmitting an end device status of the end device to the building automation system controller via a master-slave token passing network; comparing the end device status to a set of predetermined alarm responses to determine a remediation media and a recipient address; formatting the end device status and the remediation media into an alarm assistance message for transmission to the recipient address; and transmitting the alarm assistance message to the recipient address. In some embodiments, the transmitting is performed in response to a status request sent from the building automation system controller to the building automation end device. In some embodiments, the transmitting is performed in response to a fault in the building automation end device. The alarm assistance message may include an alarm acknowledgement request. The alarm processing method may include the step of receiving an alarm acknowledgement. In embodiments, the alarm acknowledgement is received at the building automation system controller.

BRIEF DESCRIPTION OF THE DRAWINGS

Various embodiments of the disclosed system and method are described herein with reference to the drawings wherein.

The various aspects of the present disclosure mentioned above are described in further detail with reference to the aforementioned figures and the following detailed description of exemplary embodiments.

DETAILED DESCRIPTION

The present disclosure is directed to systems and methods to automatically assist a BAS end user based on alarm properties received from an end device. The described techniques add a level of intelligence to the alarm system by providing the user with detailed information on how to resolve the alarm condition. The detailed information is based on a combination of various alarm property values and system property values, and is presented in the form of text, graphic, video, or other media formats. The information is made available through an email, text message or cloud notification, and also in various formats like message attachments, external links, embedded video, screenshots, firmware updates, or documents in the cloud. This assists the end user by providing vital information about the alarm together with the procedures to be performed when that particular type of alarm occurs in a system, all without requiring the user's prior knowledge about the system, documentation or manuals. The system also enables the delivery and installation of firmware and software patches when necessary to take corrective action. In addition, by empowering a user to resolve problems autonomously, the disclosed techniques offer real-time training on an as-needed basis, and may help minimize and eliminate calls to a support center.

The systems and methods disclosed herein may be advantageously employed in building automation systems such as those disclosed in U.S. Pat. No. 8,050,801, filed Aug. 22, 2005, issued Nov. 1, 2011, and entitled "Dynamically Extensible and Automatically Configurable Building Automation System and Architecture"; U.S. Pat. No. 8,099,178, filed Dec. 22, 2005, issued Jan. 17, 2012, and entitled "Building Automation System Facilitating User Customization"; U.S. Pat. No. 7,904,186, filed Dec. 22, 2005, issued Mar. 8, 2011, and entitled "Building Automation System Facilitating User Customization"; U.S. Pat. No. 8,024,054, filed Dec. 22, 2005, issued Sep. 20, 2011, and entitled "Building Automation System Facilitating User Customization"; U.S. Pat. No. 7,870,090, filed Dec. 22, 2005, issued Jan. 11, 2011, and entitled "Building Automation System Data Management"; U.S. Pat. No. 8,055,386, filed Dec. 22, 2005, issued Nov. 8, 2011, and entitled "Building Automation System Data Management"; U.S. Pat. No. 8,055,387, filed Dec. 22, 2005, issued Nov. 8, 2011, and entitled "Building Automation System Data Management"; U.S. Pat. No. 7,917,232, filed Dec. 22, 2005, issued Mar. 29, 2011, and entitled "Building Automation System Data Management"; and U.S. Pat. No. 8,290,627, filed Dec. 22, 2005, issued Oct. 16, 2012, and entitled "Dynamically Extensible and Automatically Configurable Building Automation System and Architecture," all of which are assigned to the applicant of the present disclosure, and are hereby incorporated by reference herein for all purposes.

Particular illustrative embodiments of the present disclosure are described hereinbelow with reference to the accompanying drawings; however, the disclosed embodiments are merely examples of the disclosure, which may be embodied in various forms. Well-known functions or constructions and repetitive matter are not described in detail to avoid obscuring the present disclosure in unnecessary or redundant detail. Therefore, specific structural and functional details disclosed herein are not to be interpreted as limiting, but as a basis for the claims and an exemplary basis for teaching one skilled in the art to variously employ the present disclosure in any appropriately-detailed structure. In this description, as well as in the drawings, like-referenced numbers represent elements which may perform the same, similar, or equivalent functions. The word "exemplary" is used herein to mean "serving as a non-limiting example, instance, or illustration." Any embodiment described herein as "exemplary" is not necessarily to be construed as preferred or advantageous over other embodiments. The word "example" may be used interchangeably with the term "exemplary."

Aspects of the present disclosure are described herein in terms of functional block components and various processing steps. It should be appreciated that such functional blocks configured to perform the specified functions may be embodied in mechanical devices, electromechanical devices, analog circuitry, digital circuitry, and/or modules embodied in a computer. For example, the present disclosure may employ various discrete components, integrated circuit components (e.g., memory elements, processing elements, logic elements, look-up tables, and the like) which may carry out a variety of functions, whether independently, in cooperation with one or more other components, and/or under the control of one or more processors or other control devices. One skilled in the art will also appreciate that, for security reasons, any element of the present disclosure may includes any of various suitable security features, such as firewalls, access codes, authentication, encryption, de-encryption, compression, decompression, and/or the like. It should be understood that the steps recited herein may be executed in any order and are not limited to the order presented. Moreover, two or more steps or actions recited herein may be performed concurrently.

Figure 1:
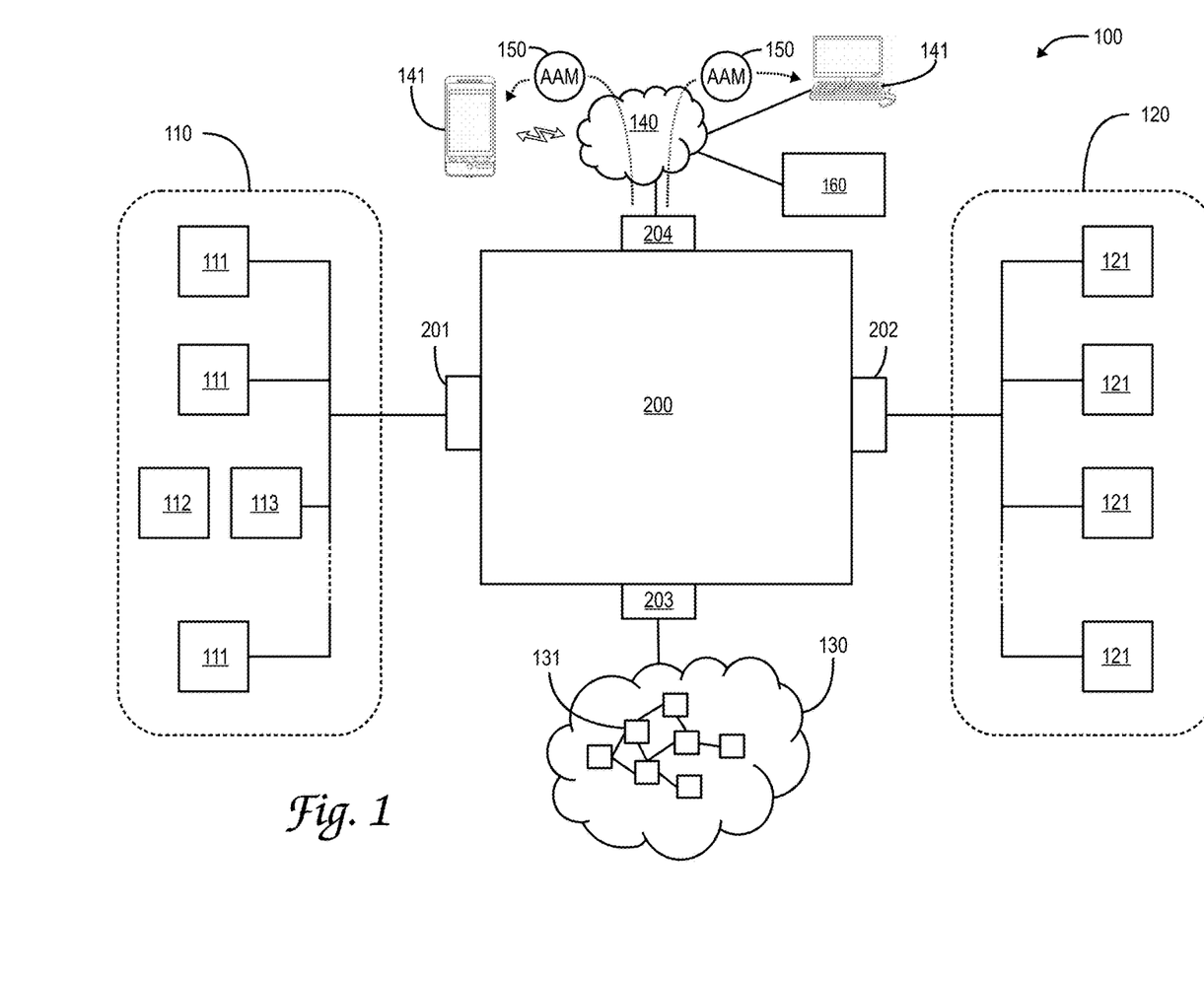
FIG. 1 is a schematic diagram of an example embodiment of a building automation system (BAS) in accordance with the present disclosure.

FIG. 1 illustrates an exemplary embodiment of a building automation system (BAS) 100 according to the present disclosure. BAS 100 includes a BAS controller 200 that is communicatively coupled with a number of building automation networks (BAN) 110, 120, 130 which facilitate communication between BAS controller 200 and any number of BAS end devices 111, 112, 121, and 131. The end devices 111, 112, 121, and 131 of BAS 100 may include a range of devices including, but not limited to, complex HVAC equipment such as chillers, air handlers, furnaces, or boilers with multiple data sensors producing a continuous stream of data, variable air volume (VAV) boxes and dampers, to simple temperature or humidity sensors monitoring an office, a classroom, factory, or external weather conditions.

In the present example, BAS controller 200 is equipped with a BACnet communications interface 201 which couples BAS controller 200 to BACnet building automation network 110. In the FIG. 1 embodiment, BACnet 110 operates using the BACNet protocol promulgated by the American National Standards Institute (ANSI) and the American Society of Heating, Refrigerating and Air-Conditioning Engineers (ASHRAE). BACnet is a master-slave token passing (MSTP) protocol implemented on an RS485/EIA485 physical layer. It is envisioned that embodiments of the present disclosure may be advantageously employed with BACnet building automation networks operating according to any BACnet standard now or in the future known, including without limitation, ANSI/ASHRAE Standard 135-1995, ANSI/ASHRAE Standard 135.1-2003, ANSI/ASHRAE Standard 135-2004, ANSI/ASHRAE Standard 135.1-2007, and BACnet-2008.

BACnet 110 includes a number of BACnet-capable networked end devices 111. Legacy end devices 112 which lack built-in BACnet compatibility are coupled to BACnet 110 using a media converter 113. Media converter 113 generates an alarm based on signals and sensor readings obtained from legacy end device 112, and additionally or alternatively, accepts alarms generated by legacy device 112 for translation into a form suitable for transmission via BACnet 110.

Still referring to FIG. 1, BAS controller 200 is equipped with a LON communications interface 201 which couples BAS controller 200 to a LON building automation network 120. LON network 120 operates according to the LONTalk® protocol standard promulgated by Echelon Corp of Santa Clara, Calif., USA. LON 120 includes a number of LONTalk®-capable networked end devices 121.

BAS controller 200 includes a ZigBee® communications interface 203 which couples BAS controller 200 to a Zigbee® building automation network 130. ZigBee® network 130 is a wireless mesh network that operates in accordance with standards published by The ZigBee Alliance of San Ramon, Calif., USA. ZigBee® is based on the IEEE 802.15.4 standard for low-power wireless devices, and while often employed with low power, cost-cost battery powered end devices such as, without limitation, temperature sensors, humidity sensors, and $CO_2$ sensors, ZigBee® may be employed with any end device suitable for use in BAS 100.

BAS controller 200 includes a data network interface 204 such as an Ethernet interface and/or an 802.11 WiFi interface for communicating an alarm assistance message (AAM) 150 to one or more user devices 141 over a data network 140, such as a private LAN and/or the public Internet. User devices 141 may include, without limitation, a mobile telephone, smart phone, tablet device, smart watch, pager, notebook computer, and/or a desktop computer. An alarm assistance message 150 received by user device 141 is displayed thereon by a software program such as a web browser; a dedicated BAS monitoring app such as the Trane Tracer™ BAS Operator Suite, published by Trane International Inc. of Davidson, N.C., USA; a software program for receiving email, SMS, or MMS messages; a software program for receiving and displaying pop-up alerts; and/or other suitable software for displaying the content of an alarm assistance message 150. In another example, the alarm assistance message 150 may be dispatched to an instant messaging or social media application currently in popular use, such as Instagram®, Snapchat®, Twitter®, Facebook® and so forth.

A remote server 160 is communicatively coupled to BAS controller 200 via data network 140 and stores remediation information for a plurality of end devices, including information relating to specific products, product versions, firmware versions, and/or software versions. Remote server 160 may be configured to store downloadable firmware and software updates which can be included in an alarm assistance message, for example, when a particular end device failure is caused by a firmware or software error or incompatibility. Remote server 160 may additionally or alternatively be configured to store remediation media, and to monitor and control access to remediation media and firmware/software updates. In embodiments, remote server 160 may comprise distributed computing and storage elements in a cloud-based configuration.

Figure 2:
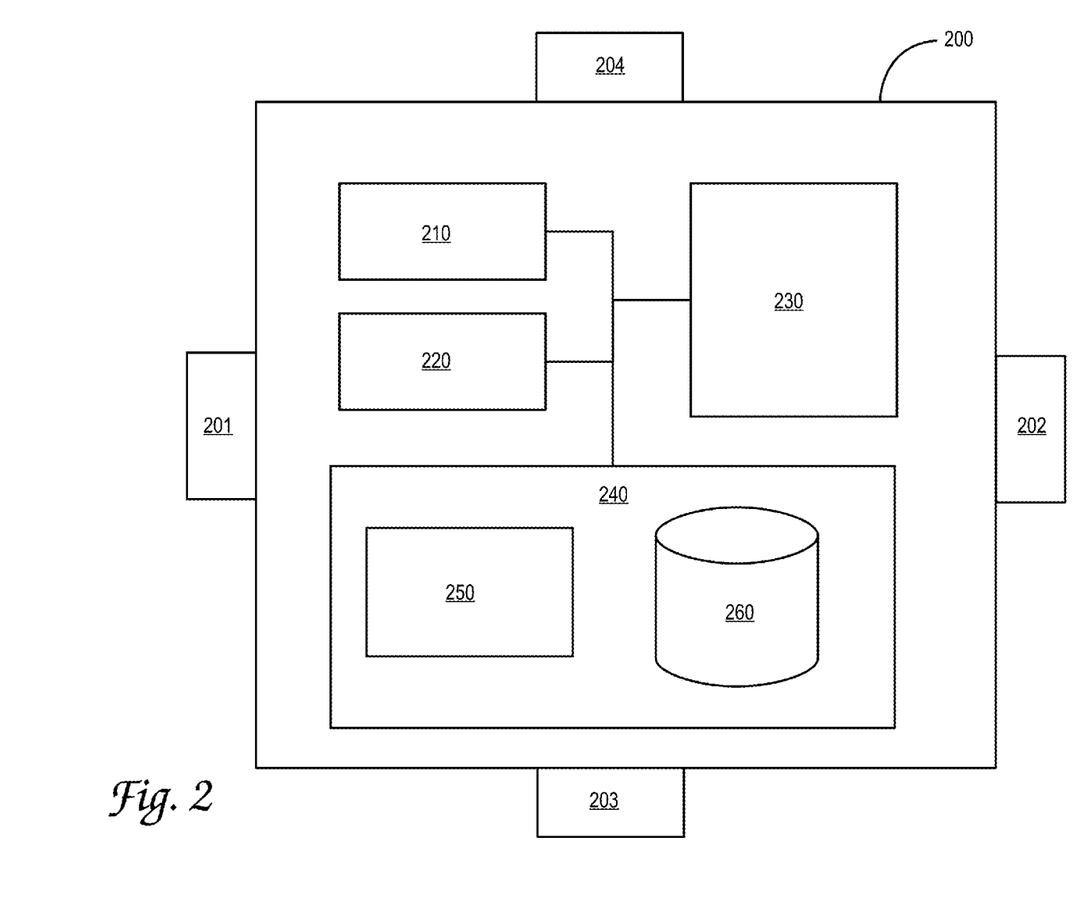
FIG. 2 is a schematic diagram of an example embodiment of a BAS controller in accordance with the present disclosure.
Figure 3:
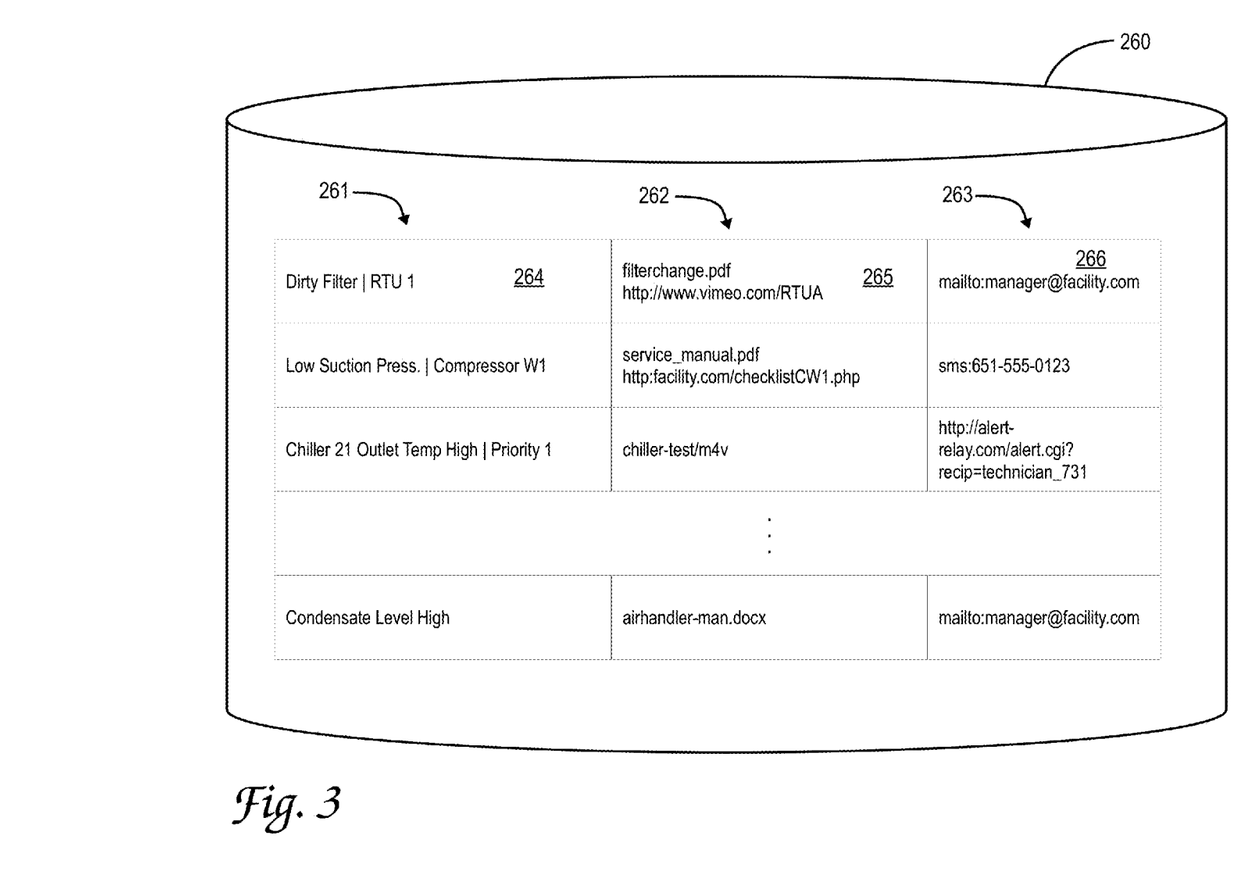
FIG. 3 illustrates an alarm assistance map in accordance with an example embodiment of the present disclosure.

Referring now to FIG. 2, BAS controller 200 includes a processor 210 in operative communication with a memory 220, a user interface 230, data store 240, alarm processor 250, and alarm assistance map 260. In this example embodiment, memory 220 comprises RAM memory which can be used, for example, for storage of transient data, computed and intermediate results, I/O buffering, GUI buffering, program execution, and other purposes familiar to the skilled artisan. Data storage 240 comprises non-volatile storage such as a flash drive, EEPROM, ROM, magnetic hard disk, solid state disk (SSD), hybrid drives (combination hard disk/SSD) which can be used for storage of data which persists through power cycling. In the present example embodiment, alarm processor 250 and alarm assistance map 260 reside within data store 240. In the illustrated embodiment, alarm processor 250 includes a set of software instructions executable on processor 210 to implement the method of assisting a user of BAS 100 based on alarm parameters as described herein. As shown in FIG. 3, alarm assistance map 260 stores associations of distinct combinations of one or more alarm parameters with corresponding remediation media and a corresponding recipient address. In some embodiments, data store 240 may optionally host one, some, or all media files to be used in the alarm assistance message 150. In some embodiments, media files may additionally or alternatively be hosted on remote server 160. In some embodiments data store 240 and/or remote server 160 may employ a distributed filesystem which provides a single logical storage unit across multiple physical devices.

User interface 230 includes a number of elements which facilitate user input and the display of output to the user, and may include any one, some, or all of buttons, switches, LED indicators, a character display such as a liquid crystal display (LCD) or a vacuum fluorescent display (VFD), a graphic display such as a thin film transistor (TFT) display, a touchscreen display, and so forth. Non-limiting examples of suitable user interface devices include a Trane Tracer AdaptiView™ and a Trane Tracer® Concierge™. In some embodiments, the recipient address may include a physical (hardware) or logical address of user interface 230, enabling alarm assistance message 150 to be displayed on user interface 230. Such embodiments may be useful where a user is physically present to monitor user interface 230, such as in a control room.

While the example embodiments discussed herein describe a single BAS, it should be understood that embodiments of the present disclosure may be utilized in a distributed, multiple-BAS system in which alarms from multiple systems are aggregated, collected, processed, monitored and/or otherwise utilized by a centralized or enterprise-level control system. Once example of an enterprise-level BAS suitable for use with the disclosed techniques is the Trane Tracer™ ES sold by Trane International Inc.

FIG. 3 illustrates alarm assistance map 260 showing a number of example sets of alarm parameters 261 mapped to corresponding sets of remediation media 262 and recipient addresses 263. In the present example, alarm assistance map 260 includes a set of alarm parameters 264 which maps a "dirty filter" alarm received from rooftop unit (RTU) 1 to a set of remediation media 265. The set of remediation media 265 specifies which document(s) are to be attached to and/or hyperlinked from the alarm assistance message which is generated in response to the received alarm. In this example, a portable document format (PDF) document identified as "filterchange.pdf" is attached to the alarm assistance message, and a link to an online video having a uniform resource locator (URL) of http://www.vimeo.com/RTUA is included within the alarm assistance message. Continuing with the present example, the alarm parameter mapping additionally maps the RTU 1 "dirty filter" alarm parameters 264 to a set of recipient addresses. Here, the set of recipient addresses includes a single address indicated as mailto: manager@facility.com. Note that, to ensure proper delivery, alarm assistance message 150 is formatted in accordance with the type of recipient address specified. That is, when the recipient address is an email address, alarm assistance message 150 will be formatted in accordance with standards for SMTP communications. When the recipient address is a short message service (SMS) address, alarm assistance message 150 will be formatted as an SMS message. In cases where alarm assistance message 150 is delivered via an application programming interface (API) to, for example, user interface 230 or an instant messaging service, the appropriate API (e.g., REST, SOAP, library modules, etc.) is used. Where multiple recipient addresses are specified, a properly-formatted alarm assistance message 150 is delivered to each recipient. In some embodiment, a hyperlink URL to a remediation document includes an access token or unique identifier which restricts access to the remediation document and/or identifies the user or recipient address that is attempting to access the remediation document. Throughout this disclosure, the term remediation media includes a remediation document, such as without limitation a .PDF, a .JPG, a .DOC file, a firmware or software download, and/or a link to a remediation document, such as a URL.

In embodiments where a remediation document includes a firmware or software download, user activation of the remediation document initiates the firmware or software update process. In a non-limiting example, if the remediation document includes a firmware update for a BAS end device, the user will have the ability to activate the firmware update from user device 141 which, in turn, causes the firmware update to be applied to the target end device.

The recipient address may be specific to a particular time period. This enables alarm assistance message 150 to be delivered to the appropriate person at the appropriate times, e.g., a technician will only receive alarm assistance messages during those hours the technician is on-call. In some embodiments, a scheduling database is queried to determine when a particular recipient address should receive alarm assistance messages. For example, an employee schedule may be queried to determine when a user is on-call, on vacation, has called in sick, etc. This ensures alarm assistance messages are delivered in an effective and reliable manner.

BAS controller 200 may be configured to automatically identify the various end devices 111, 112, 121, and/or 131 which comprise BAS 100, and to pre-populate alarm assistance map 260 with a list of the identified end devices and the alarms and alarm parameters that each end device is known to generate. This enables a technical administrator to rapidly and effectively specify, modify, and/or verify the remediation media associated with each alarm for each end device. BAS controller 200 may additionally or alternatively pre-populate alarm assistance map 260 with remediation media as a baseline configuration. In embodiments, BAS controller 200 is configured to automatically download the remediation media associated with each alarm condition from remote server 160 into alarm assistance map 260. The downloaded media may be used as a template or starting point which is then customized by a technical administrator, or, can be used as-is. In some embodiments, BAS controller 200 relies upon local data (e.g., remedial media, firmware, etc.) previously entered by a user or previously downloaded from remote server 160 to generate an alarm assistance message 150. In some embodiments, BAS controller 200 additionally or alternatively relies upon real-time download of remote data from remote server 160 to generate the alarm assistance message 150. This ensures the latest version of remedial data is presented to the user.

Figure 4:
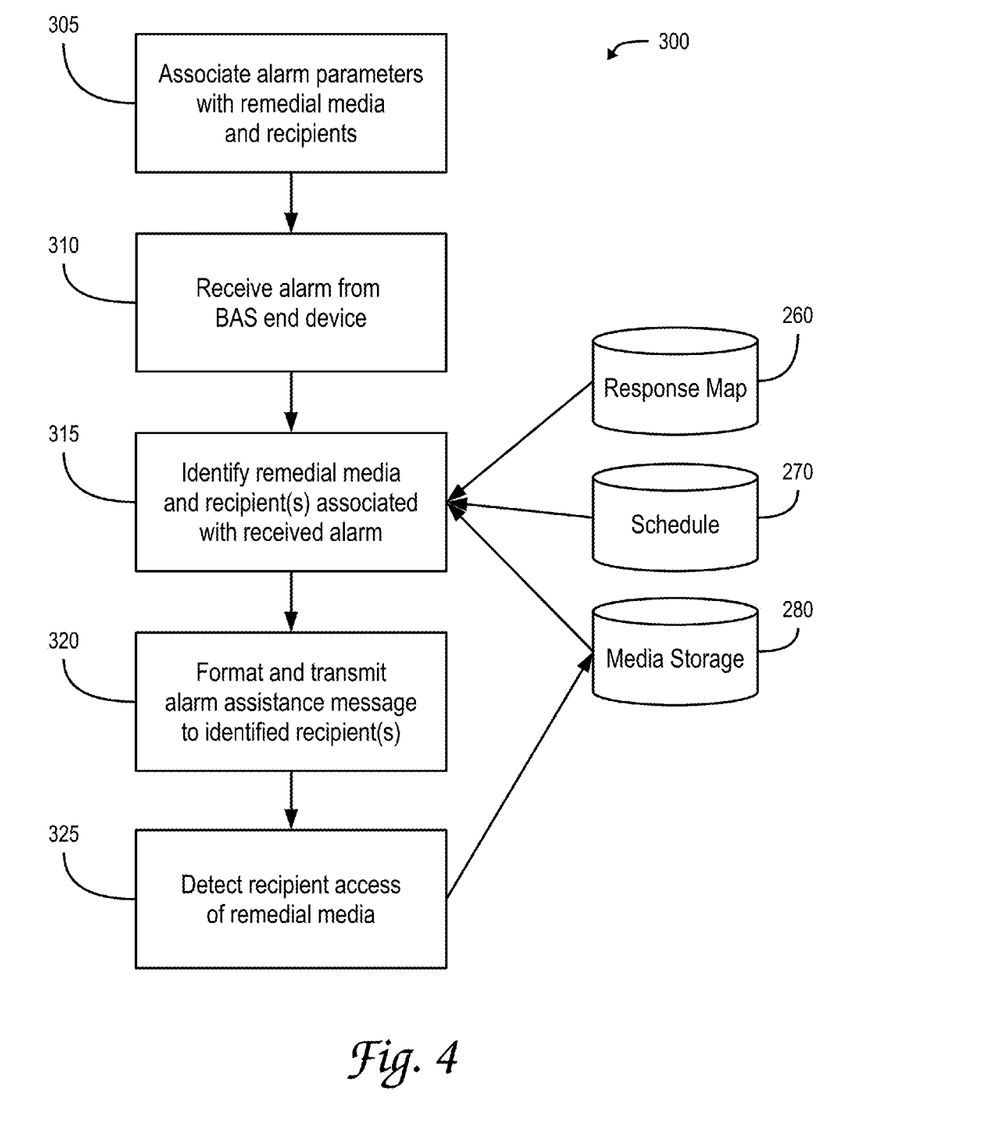
FIG. 4 illustrates a method of operating a BAS in accordance with an example embodiment of the present disclosure.

Turning now to FIG. 4, a method 300 of operating a BAS in accordance with an exemplary embodiment of the present disclosure is illustrated. In step 305, a set of alarm parameters is associated with a set of desired remedial media and a set of recipient address(es). In an example embodiment, a user inputs one or more specific alarm parameters sufficient to identify the source and nature of the alarm, such as a unique BAS end device identifier, a sensor value, a status identifier, an alarm severity indicator, an end device location, a network identifier and/or an alarm priority. The user also identifies the particular remedial media, e.g., which documents, videos, hyperlinks and so forth, that will assist a user in troubleshooting and correcting the condition which caused the alarm. The user also inputs one or more recipient addresses to which an alarm assistance message is transmitted when the specified alarm parameters are matched to an active alarm event. In another example embodiment, the set of remedial media for a particular BAS end device may be identified via a download from a remote server.

In embodiments, user interface 230 of BAS controller 200 may be employed by the user to input alarm parameter associations, and, additionally or alternatively, a user device 141 may be employed, using, for example, a browser or other application software, to perform the associations.

In step 310, an alarm comprising one or more alarm parameters is received from a BAS end device, and in step 315, one or more of the received alarm parameters is compared with the sets of alarm parameters previously associated in step 305 to identify a corresponding set of remedial media and recipient address(es). Optionally, a schedule 270 may be queried to determine if an identified recipient address is designated to receive alarm assistance messages at the then-current time. If such a determination is made, the alarm assistance message is addressed to the time-appropriate recipient(s). In step 320, the alarm assistance message is formatted in accordance with the requirements of the specified receipt address and transmitted to the recipient address. In step 325, the act of accessing the remedial media by the recipient is detected and optionally recorded, for example, a visit to a hyperlinked remedial document may be recorded at the hosting server. This may be useful to perform quantitative analysis to assess system effectiveness, user acceptance rates, and procedural compliance.

Figure 5:
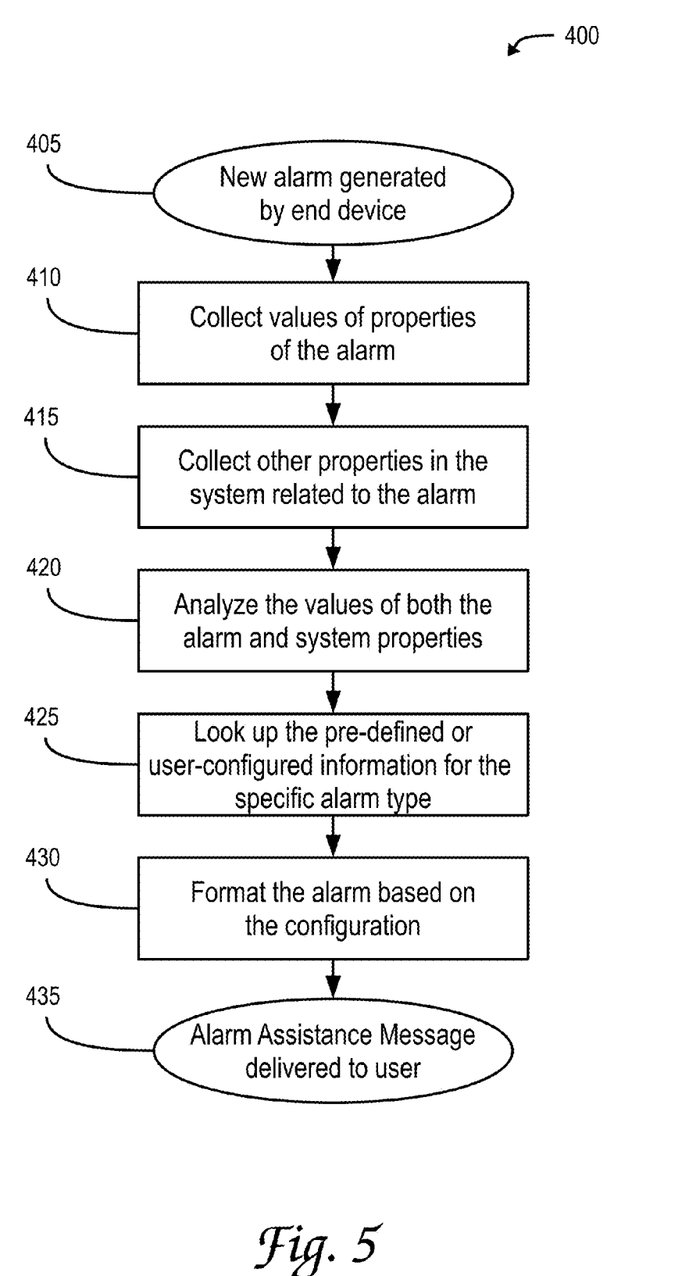
FIG. 5 illustrates a method of operating a BAS for generating an alarm assistance message using locally available data in accordance with an example embodiment of the present disclosure.

FIG. 5 illustrates an exemplary embodiment of a method 400 for generating an alarm assistance message using data available locally to the BAS controller 200. In step 405 an alarm is generated by an end device and in step 410, the values of the alarm properties are collected. Examples of alarm properties include, without limitation, an alarm ID which identifies the nature of the alarm condition, a unique device ID which identifies the particular device which issued the alarm, a software version ID which indicates which firmware or software version is running on the end device, a controller ID, a communication link or network address ID, an alarm value, an alarm severity, an alarm priority, an alarm timestamp which indicates the time and date the alarm occurred, and so forth. In addition to or alternatively to receiving alarm messages, BAS controller 200 may solicit a status message from an end device by transmitting a status request message to the target end device, which, in turn, responds with the requested status message. This technique is employed to gather information about a system property or condition which involves a number of related end devices, as discussed in more detail below.

Another example of an alarm property is an "alarm acknowledgement required" flag. The "alarm acknowledgement required" flag indicates the alarm requires acknowledgement of reception. For an alarm to be acknowledged, a user must take an action to indicate that he or she is aware of this alarm. In some embodiment, the user acknowledges the alarm by selecting an alarm indicator on user interface 230 and choosing an "Acknowledge" selection. In some embodiments, a user replies to the alarm assistance message to acknowledge the alarm. In some embodiments, access by the user of one or more of the remediation media included in the alarm assistance message acknowledges the alarm. In these embodiments, access must occur subsequent to the alarm to effectuate acknowledgement. In some embodiments, the alarm assistance message is retransmitted if an alarm acknowledgement is not given within an acknowledgement time period. In some embodiments, the acknowledgement time period is dependent upon an alarm parameter. For example, a higher-priority alarm which urgently needs attention (such as rapid pressure loss) would have a shorter acknowledgement time period than a lower priority alarm (such as a dirty filter).

In step 415, system properties related to the alarm are collected, for example, a physical location of the end device, vendor information which identifies the manufacturer of the equipment that issued the alarm, manufacturing date, production lot, and so forth. The system properties may also define a relationship between an alarm and its effect on other components, subsystems, and applications of the BAS. For example, multiple VAV boxes can be organized as members of an area monitoring software application running on BAS controller 200. The area monitoring application calculates an average temperature of its members; in this case, this would be the average space temperature of the VAVs which are members of the monitored area. Assume an alarm occurs at one of the VAVs which indicates a space temperature sensor has failed. Based on the VAV device alarm, the area application generates a system alarm based on the VAV failure. The system alarm indicates an "average space temperature error" due to a failure of the space temperature sensor of VAV unit 1. Thus, while the failure occurs at the unit level, system properties enable the disclosed method to generate a system-level alarm in step 420.

In step 420, the alarm properties and system properties are analyzed to determine the issue which caused the alarm and the type of corrective action which needs to be taken. In another illustration, a BAS controller 200 includes a chiller plant control application that includes chillers as members. When a chiller is started up, a number of actions or conditions need to be confirmed before proceeding to the next step in the startup sequence. For example, the chiller application must confirm the compressors in the chiller are started before the rest of the startup sequence can take place. The BAS controller 200 issues a status request message to chiller to confirm the compressors are running. If the chiller responds with a status message that does not indicate the compressors are running, or the status message is not received within an expected time period, the chiller application can generate an alarm stating it has failed to confirm the chiller is running. The alarm from the chiller plant application will include the name of the chiller at fault, the severity of the failure, when and why the alarm was generated, which is then utilized to identify a corrective action.

In step 425, pre-defined or user-defined remedial media corresponding to the corrective action, as well as recipient addresses, are identified. In step 430, the identified media is formatted as an alarm assistance message for transmission to the recipient(s), and in step 435, the alarm assistance message is transmitted to the recipient(s). It should be noted that, where more than one recipient is specified, and each recipient requires its own, possibly different, message format, the alarm assistance message can be formatted for transmission in one or more different formats as needed to seamlessly accommodate a wide variety of recipient devices.

Figure 6:
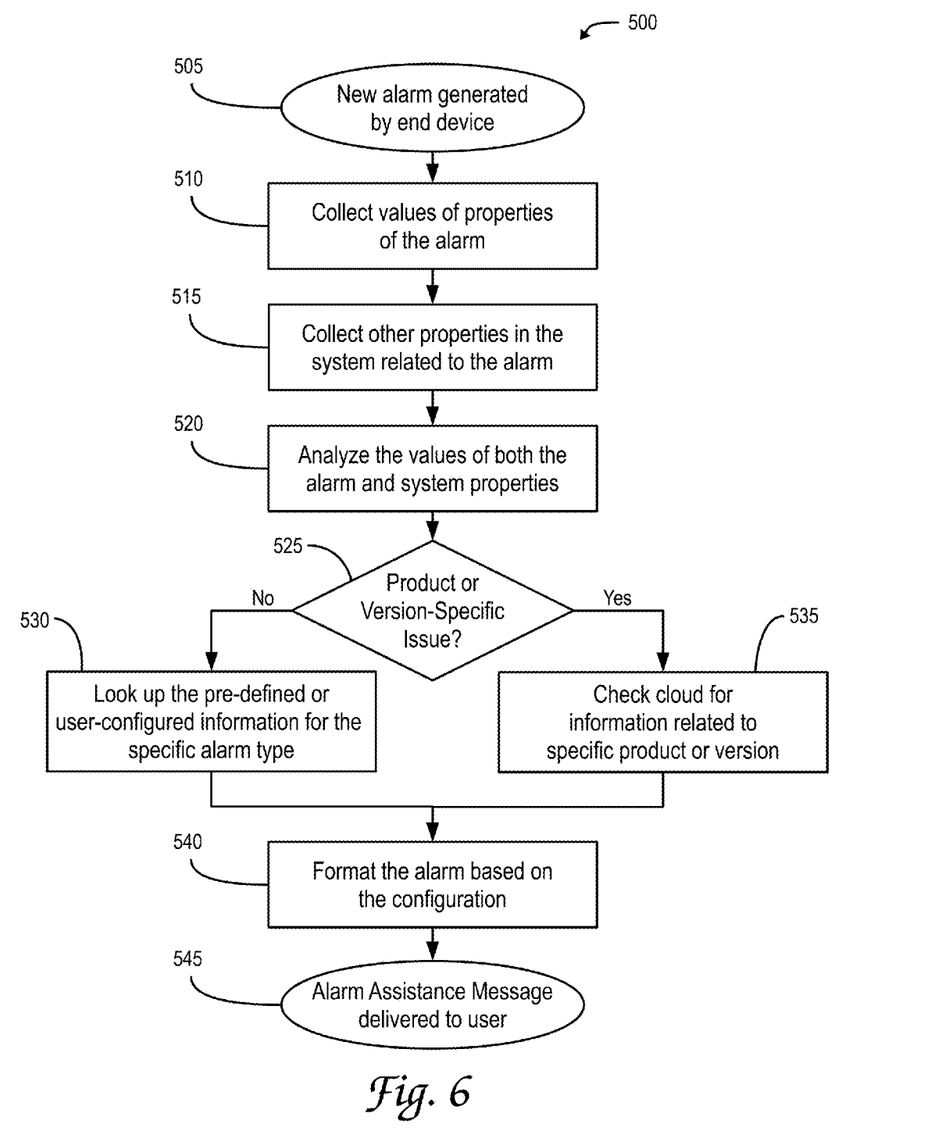
FIG. 6 illustrates a method of operating a BAS for generating an alarm assistance message using locally or remotely available data in accordance with an example embodiment of the present disclosure.

Turning now to FIG. 6, an exemplary embodiment of a method 500 for generating an alarm assistance message by a BAS controller 200 using locally- and remotely-available data is shown. In step 505 an alarm is generated by an end device and in step 510, the values of the alarm properties are collected and in step 515, system properties related to the alarm are collected. In step 520, the alarm properties and system properties are analyzed to determine the issue which caused the alarm and type of corrective action to be taken. In the step 525, if the alarm-causing issue is determined to be specific to a particular product or a particular version of a product, then step 530 is performed where remedial information and media relating to the alarm-causing issue is dynamically obtained from a remote server (e.g., the cloud). Otherwise, if the alarm-causing issue is not product- or version-specific (e.g., a dirty filter has been flagged), then step 535 is performed where pre-defined or user-defined remedial media corresponding to the corrective action are identified. In step 540, one or more recipient addresses are identified and the remedial media is formatted as an alarm assistance message using the requisite message format for transmission to the identified recipient(s), and in step 545, the alarm assistance message is transmitted to the recipient(s).

While the example embodiments described herein are single threaded example, a multi-threaded approach may also be utilized. One potential embodiment of such a multi-threaded system for alarm processing may employ a thread monitor or scheduler that would assess the alarm processing activity in real time and increase or decrease the number of threads utilized by the system in order to achieve the most efficient utilization of network communication and processor capacity.

ASPECTS

It is noted that any of aspects 1-26 may be combined with each other in any suitable combination.

Aspect 1. A BAS controller adapted for use in a building automation system (BAS) having a plurality of end devices coupled to the BAS controller via a building automation communication network, comprising: an alarm processor configured to receive an alarm message to generate an alarm assistance message comprising remediation media and a recipient address.

Aspect 2. The BAS controller in accordance with aspect 1, wherein the alarm processor is configured to receive the alarm message from at least one of the plurality of end devices.

Aspect 3. The BAS controller in accordance with any of aspects 1-2, wherein the building automation communication network comprises a BACnet, a LON, and/or a wireless mesh network.

Aspect 4. The BAS controller in accordance with any of aspects 1-3, wherein the alarm assistance message is generated based on at least one alarm parameter included in the alarm message.

Aspect 5. The BAS controller in accordance with any of aspects 1-4, wherein the alarm parameter is selected from the group consisting of an end device type, a unique end device identifier, a sensor value, a status identifier, an alarm severity indicator, an end device location, a network identifier, a timestamp, and/or an alarm priority.

Aspect 6. The BAS controller in accordance with any of aspects 1-5, wherein the alarm assistance message is transmitted to an end user at the recipient address.

Aspect 7. The BAS controller in accordance with any of aspect 1-6, wherein the recipient address is determined, at least in part, based upon the time of day at which the alarm assistance message is transmitted.

Aspect 8. The BAS controller in accordance with any of aspects 1-7, wherein the transmission of the alarm response is via one or more of an email message, an SMS message, an MMS message, and/or an application programming interface.

Aspect 9. The BAS controller in accordance with any of aspects 1-8, wherein the remediation media comprises at least one of a document and/or a hyperlink.

Aspect 10. The BAS controller in accordance with any of aspects 1-9, wherein the alarm processor further comprises an alarm assistance map that associates distinct combinations of one or more alarm parameters with corresponding remediation media and/or corresponding recipient address; and wherein the alarm processor generates the alarm response in accordance with the alarm assistance map.

Aspect 11. The BAS controller in accordance with any of aspects 1-10, wherein the alarm assistance map is user-configurable.

Aspect 12. The BAS controller in accordance with any of aspects 1-11, wherein the alarm assistance map is configurable via instructions downloaded from a remote server.

Aspect 13. A building automation system (BAS) comprising one or more end devices configured to transmit an alarm message comprising at least one alarm parameter; a building automation network communicatively coupled to the one or more end devices; a BAS controller communicatively coupled to the building automation network, the BAS controller including a processor and a memory storing executable instructions, which, when executed on the processor, cause the BAS controller to receive, from one of the one or more end devices, an alarm message; identify remediation media and a recipient address corresponding to the alarm message; and transmit an alarm assistance message comprising the identified remediation media to the recipient address.

Aspect 14. The BAS in accordance with aspect 13, wherein the executable instructions further cause the BAS controller to format the alarm assistance message in accordance with the type of recipient address.

Aspect 15. The BAS in accordance with any of aspects 13-14, wherein the executable instructions further cause the BAS controller to transmit the alarm assistance message based upon a determination that the identified recipient address of the alarm assistance message is designated to receive an alarm assistance messages at the current time.

Aspect 16. The BAS in accordance with any of aspects 13-15, further comprising a graphical user interface (GUI) communicatively coupled to the BAS controller and adapted to enable an end user to associate BAS end device alarm parameters with remediation media and/or a recipient address.

Aspect 17. The BAS in accordance with any of aspects 13-16, wherein the building automation communication network comprises a BACnet, a LON, and/or a wireless mesh network.

Aspect 18. A method of operating a building automation system (BAS), comprising: providing a response map that associates distinct combinations of one or more alarm parameters with corresponding remediation media and a corresponding recipient address; receiving, from an end device of a building automation network, an alarm message comprising an alarm parameter; identifying remediation media and a recipient address corresponding to the alarm message; and transmitting an alarm assistance message to the recipient address, wherein the alarm assistance message includes the identified remediation media.

Aspect 19. The method in accordance with aspect 18, further comprising formatting the alarm assistance message in accordance with the type of recipient address.

Aspect 20. The method in accordance with any of aspects 18-19, further comprising performing the transmitting based upon a determination that the identified recipient address is designated to receive an alarm assistance messages at the current time.

Aspect 21. The method in accordance with any of aspects 18-20, further comprising detecting an access to the remedial media by the recipient.

Aspect 22. An alarm processing method in a building automation system (BAS) having a building automation system controller and a building automation end device, comprising transmitting an end device status of the end device to the building automation system controller via a master-slave token passing network; comparing the end device status to a set of predetermined alarm responses to determine a remediation media and a recipient address; formatting the end device status and the remediation media into an alarm assistance message for transmission to the recipient address; and transmitting the alarm assistance message to the recipient address.

Aspect 23. The alarm processing method in accordance with aspect 22, wherein the transmitting is in response to a status request sent from the building automation system controller to the building automation end device.

Aspect 24. The alarm processing method in accordance with any of aspects 22-23, wherein the transmitting is in response to a fault in the building automation end device.

Aspect 25. The alarm processing method in accordance with any of aspects 22-24, wherein the alarm assistance message comprises an alarm acknowledgement request.

Aspect 26. The alarm processing method in accordance with any of aspects 22-25, further comprising receiving an alarm acknowledgement.

Particular embodiments of the present disclosure have been described herein, however, it is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in any appropriately detailed structure.

What is claimed is:

1. A building automation system (BAS) controller having a plurality of end devices coupled to the BAS controller via a building automation communication network, comprising:
   an alarm processor configured to receive an alarm message comprising one or more alarm parameters to generate an alarm assistance message comprising remediation media and a recipient address; and
   an alarm assistance map that associates distinct combinations of one or more alarm parameters with corresponding remediation media and/or corresponding recipient address, wherein the alarm processor generates the alarm assistance message in accordance with the alarm assistance map.

2. The BAS controller in accordance with claim 1, wherein the alarm processor is configured to receive the alarm message from at least one of the plurality of end devices.

3. The BAS controller in accordance with claim 1, wherein the building automation communication network comprises a BACnet, a LON, and/or a wireless mesh network.

4. The BAS controller in accordance with claim 1, wherein the alarm assistance message is generated based on at least one alarm parameter included in the alarm message.

5. The BAS controller in accordance with claim 4, wherein the alarm parameter is selected from the group consisting of an end device type, a unique end device identifier, a sensor value, a status identifier, an alarm severity indicator, an end device location, a network identifier, a timestamp, and/or an alarm priority.

6. The BAS controller in accordance with claim 1, wherein the alarm assistance message is transmitted to an end user at the recipient address.

7. The BAS controller in accordance with claim 6, wherein the recipient address is determined, at least in part, based upon the time of day at which the alarm assistance message is transmitted.

8. The BAS controller in accordance with claim 1, wherein the transmission of the alarm response is via one or more of an email message, an SMS message, an MMS message, and/or an application programming interface.

9. The BAS controller in accordance with claim 1, wherein the remediation media comprises at least one of a document and/or a hyperlink.

10. The BAS controller in accordance with claim 1, wherein the alarm assistance map is user-configurable.

11. The BAS controller in accordance with claim 1, wherein the alarm assistance map is configurable via instructions downloaded from a remote server.

12. A building automation system (BAS) comprising:
   one or more end devices configured to transmit an alarm message comprising at least one alarm parameter;
   a building automation network communicatively coupled to the one or more end devices;
   a BAS controller communicatively coupled to the building automation network, the BAS controller including a processor and a memory storing executable instructions, which, when executed on the processor, cause the BAS controller to:
   receive, from one of the one or more end devices, an alarm message comprising one or more alarm parameters;
   identify, from an alarm assistance map that associates distinct combinations of one or more alarm parameters with corresponding remediation media and/or corresponding recipient address, the alarm assistance message in accordance with the alarm assistance map; and transmit the alarm assistance message comprising the identified remediation media to the recipient address.

13. The BAS in accordance with claim 12, wherein the executable instructions further cause the BAS controller to format the alarm assistance message in accordance with the type of recipient address.

14. The BAS in accordance with claim 12, wherein the executable instructions further cause the BAS controller to transmit the alarm assistance message based upon a determination that the identified recipient address of the alarm assistance message is designated to receive an alarm assistance messages at the current time.

15. The BAS in accordance with claim 12, further comprising a graphical user interface (GUI) communicatively coupled to the BAS controller, wherein the GUI enables an end user to associate BAS end device alarm parameters with remediation media and/or a recipient address.

16. The BAS in accordance with claim 12, wherein the building automation communication network comprises a BACnet, a LON, and/or a wireless mesh network.

17. A method of operating a building automation system (BAS), comprising:

providing an alarm assistance map that associates distinct combinations of one or more alarm parameters with corresponding remediation media and a corresponding recipient address;

receiving, from an end device of a building automation network, an alarm message comprising one or more alarm parameters;

identifying, in accordance with the alarm assistance map and the one or more alarm parameters, remediation media and a recipient address corresponding to the alarm message; and transmitting an alarm assistance message to the recipient address, wherein the alarm assistance message includes the identified remediation media.

18. The method in accordance with claim 17, further comprising formatting the alarm assistance message in accordance with the type of recipient address.

19. The method in accordance with claim 17, further comprising performing the transmitting based upon a determination that the identified recipient address is designated to receive an alarm assistance messages at the current time.

20. The method in accordance with claim 17, further comprising detecting an access to the remediation media by the recipient.

\* \* \* \* \*